United States Patent
Matsumoto et al.

(10) Patent No.: US 7,137,180 B2
(45) Date of Patent: Nov. 21, 2006

(54) TURRET FOR MACHINE TOOL

(75) Inventors: Mitsuji Matsumoto, Yamatokoriyama (JP); Haruki Ishiguro, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 51 days.

(21) Appl. No.: 11/011,052

(22) Filed: Dec. 15, 2004

(65) Prior Publication Data

US 2005/0132550 A1    Jun. 23, 2005

(30) Foreign Application Priority Data

Dec. 17, 2003   (JP)   .............. 2003-419055

(51) Int. Cl.
  B23P 23/02   (2006.01)
  B23B 3/16    (2006.01)
(52) U.S. Cl. .................. 29/40; 29/48.5; 74/813 R; 74/826
(58) Field of Classification Search .............. 29/40, 29/39, 48.5 R; 144/48.1; 82/159, 120–121; 74/813 R, 813 L, 826, 813 C
See application file for complete search history.

(56) References Cited

U.S. PATENT DOCUMENTS

| | | | |
|---|---|---|---|
| 3,760,472 A * | 9/1973 | Kielma et al. .......... | 29/40 |
| 4,090,281 A | 5/1978 | Hautau | |
| 4,833,764 A * | 5/1989 | Muller .............. | 29/40 |
| 4,991,474 A * | 2/1991 | Thumm et al. ........ | 82/159 |
| 5,720,090 A * | 2/1998 | Dawson, Jr. .......... | 29/40 |
| 6,925,694 B1 * | 8/2005 | Sauter et al. .......... | 29/40 |
| 2004/0103510 A1 | 6/2004 | Sauter et al. | |
| 2006/0064861 A1 * | 3/2006 | Ishiguro .............. | 29/40 |

FOREIGN PATENT DOCUMENTS

| | | |
|---|---|---|
| EP | 0 331 003 A2 | 9/1989 |
| EP | 1 287 931 A2 | 3/2003 |
| JP | 5-228708 A * | 9/1993 |
| JP | 2003-251505 | 9/2003 |
| WO | WO 03/000459 A1 | 1/2003 |

OTHER PUBLICATIONS

European Search Report dated Mar. 24, 2005.

* cited by examiner

Primary Examiner—Erica Cadugan
(74) Attorney, Agent, or Firm—Armstrong, Kratz, Quintos, Hanson & Brooks, LLP

(57) ABSTRACT

A turret for a machine tool is provided with: a turret body; a swiveling drum on which a tool holder for holding the rotating tool is mountable; a swiveling and indexing drive portion for swiveling the swiveling drum with a swiveling and indexing motor and for indexing any desired rotating tool; and a rotational driving motor, having a rotating shaft directed to an index position, incorporated into the swiveling drum and supported to the turret body. Under the condition that the rotating tool is indexed, a holder shaft of the tool holder of the rotating tool and the rotating shaft are coupled directly with each other and thereby the rotating tool is rotated by the rotational driving motor. Thus, when the rotating tool is drivingly rotated, the power transmission efficiency for rotational drive is high to thereby make it possible to reduce the heat generation, vibration and noise.

8 Claims, 3 Drawing Sheets

TURRET FOR MACHINE TOOL

BACKGROUND OF THE INVENTION

1. Field of the Invention

The present invention relates to a turret for a machine tool in which at least one rotating tool is mounted on the turret and this rotating tool is rotated for machining a workpiece.

2. Description of the Related Art

In, for example, a lathe out of machine tools, a single or a plurality of rotating tools are mounted on a turret, and the rotating tool is rotated by a rotational driving motor and machines a workpiece. In such a lathe, a swivel portion is provided on a head portion of the turret. The plurality of tools such as rotating tools or other tools are mounted radially on this swivel portion.

The swivel portion makes a swiveling motion so that a desired rotating tool or another tool is indexed at an index position. When the rotating tool is indexed, the rotating tool is rotated by the rotational driving motor. For this reason, a driving force (running torque) of the rotational driving motor is transmitted to the rotating tool by a power transmission mechanism having a belt, a bevel gear, a bearing or the like.

For example, Japanese Patent Application Laid-Open No. 2003-251505 describes a turret for rotating tools of a lathe in which a driving force of a rotational driving motor is transmitted to the rotating tool by bevel gears or the like. An interior of a swivel portion of the rotating tool turret is hollow. The bevel gears, bearings and the like of a power transmission mechanism are incorporated in this hollow space.

In the above-described conventional lathe or the lathe described in Japanese Patent Application Laid-Open No. 2003-251505, a rotational driving motor is arranged at a place remote from the rotating tools.

Accordingly, a structure of the power transmission mechanism for rotating the tool is complicated. Heat and vibration are generated from the belts, bevel gears, bearings and the like of the power transmission mechanism. As a result, an energy loss occurs so that the power transmission efficiency degrades and noise is also generated.

SUMMARY OF THE INVENTION

Accordingly, in order to overcome the above-noted defects, an object of the present invention is to provide a turret for a machine tool which is excellent in power transmission efficiency for the rotational drive, when the rotating tool is drivingly rotated, and which may reduce generated heat, vibration and noise and may make it possible to simplify a structure of the turret.

In order to attain the above-noted or other objects, according to the present invention, there is provided a turret for a machine tool in which at least one rotating tool is mounted on the turret and the rotating tool is rotated for machining a workpiece, the turret comprises: a turret body supported to a base of the machine tool; a swiveling drum on which at least one tool holder for holding the rotating tool is mountable and which is supported to the turret body; a swiveling and indexing drive portion for swiveling the swiveling drum with a swiveling and indexing motor and for indexing a desired rotating tool to an index position; and a rotational driving motor, having a rotating shaft directed to the index position, incorporated in the swiveling drum and supported to the turret body, wherein a holder shaft of the tool holder of the rotating tool and the rotating shaft of the rotational driving motor are coupled directly with each other so that the rotating tool is rotated by the rotational driving motor while the rotating tool is indexed at the index position.

Preferably, the rotating shaft of the rotational driving motor is movable along a rotary centerline of the rotating shaft by a feeding and reversing drive portion so that the rotating shaft engages with the holder shaft or disengages from the holder shaft.

Preferably, the swiveling drum is supported on one side to the turret body and on the other side to a housing of the rotational driving motor and thereby swivels.

Preferably, a recess groove extending in a swivel direction of the swiveling drum and opened in both directions and downwardly is formed in one end portion of the rotating shaft, a convex portion is mounted on the holder shaft of the tool holder, the convex portion projects outwardly in the axial direction from a tip end portion of the holder shaft, and the recess groove and the convex portion constitute a joint portion for coupling and decoupling the rotating shaft and the tool holder.

Preferably, the recess groove and the convex portion are formed into a tapered shape and the convex portion is detachably engaged with the recess groove.

Preferably, when the rotating shaft is at a standstill, the rotational driving motor is controlled so that the recess groove of the rotating shaft is directed in the swivel direction of the swiveling drum, whereby when the swiveling drum makes a swiveling motion, the convex portion of the tool holder moves and passes through the recess groove in the joint portion.

Preferably, under the condition that the rotating tool is indexed at the index position, the convex portion is engaged with the recess groove, and when the rotating shaft rotates under the condition that the convex portion is in engagement with the recess groove, a running torque of the rotating shaft is transferred to the holder shaft in the joint portion and thereby rotates the rotating tool.

Preferably, when the rotating tool is indexed at the index position, the convex portion is in engagement with the recess groove so that the rotating shaft and the holder shaft are coupled with each other, and under this condition, a positional relationship of a rotor of the rotational driving motor to a stator is such a positional relationship that an output torque of the rotational driving motor becomes the best.

Since the turret for the machine tool according to the present invention is constructed as described above, it is possible to enhance the power transmission efficiency for the rotational drive, when the rotating tool is drivingly rotated, and to reduce generated heat, vibration and noise and to make it possible to simplify a structure of the turret.

BRIEF DESCRIPTION OF THE DRAWINGS

FIG. 1 is a frontal view of a turret.

FIG. 2 is a cross-sectional view taken along the like II—II of FIG. 1.

FIG. 3 is a partially enlarged cross-sectional view of FIG. 2.

MODE OF EMBODYING THE INVENTION

When the driving force of the rotational driving motor of the turret is to be transmitted to the rotating tool, in the conventional power transmission mechanism, the heat and the vibration occur from the belts, bevel gears, bearings and the like to suffer from the energy loss.

In contrast, in the foregoing embodiment, a rotational driving motor is incorporated in a swiveling drum. Namely, the rotational driving motor for rotating the rotating tool is arranged within the swiveling drum most adjacent to the rotating tool.

Accordingly, a holder shaft of a tool holder for holding the rotating tool and a rotating shaft of the rotational driving motor are coupled directly with each other. As a result, since the above-described energy loss would not occur, it is possible to enhance the power transmission efficiency. It is possible to reduce the heat generation, the vibration and the noise and to simplify the structure of the turret.

DESCRIPTION OF THE PREFERRED EMBODIMENTS

One embodiment of the present invention will now be described with reference to FIG. 1 to FIG. 3.

Figure 1:
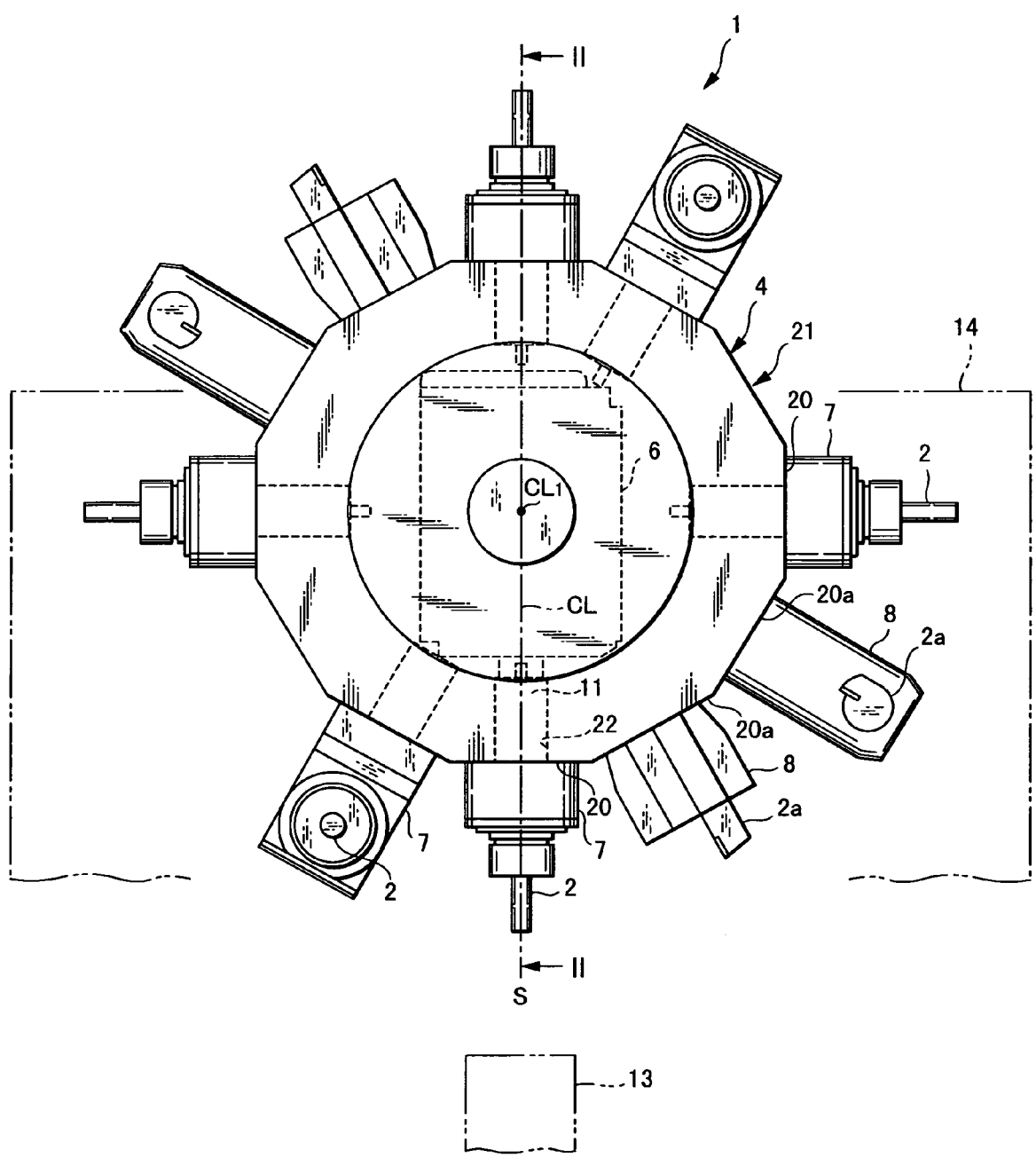
FIG. 1 to FIG. 3 show one embodiment of the present invention.
Figure 2:
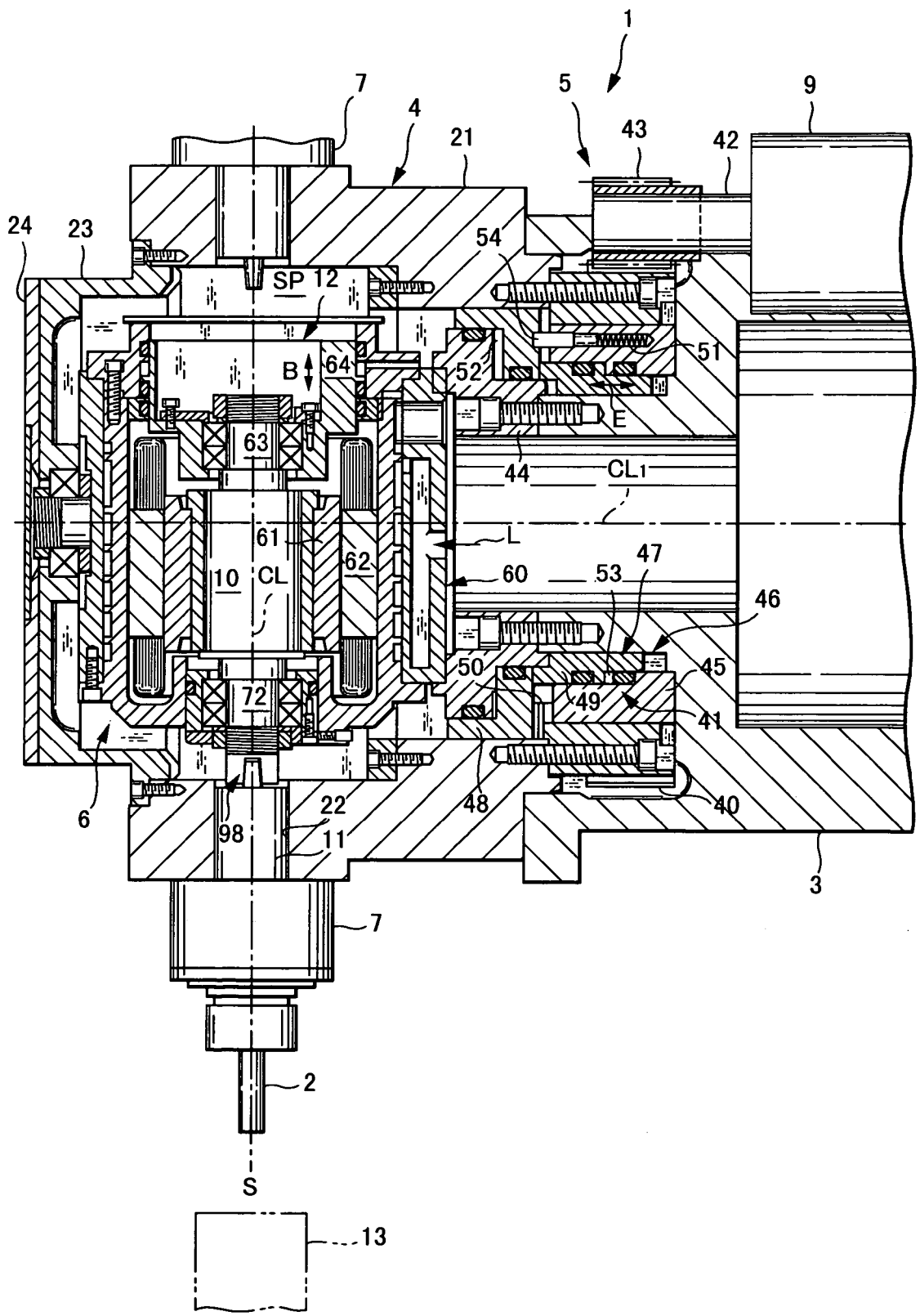
Figure 3:
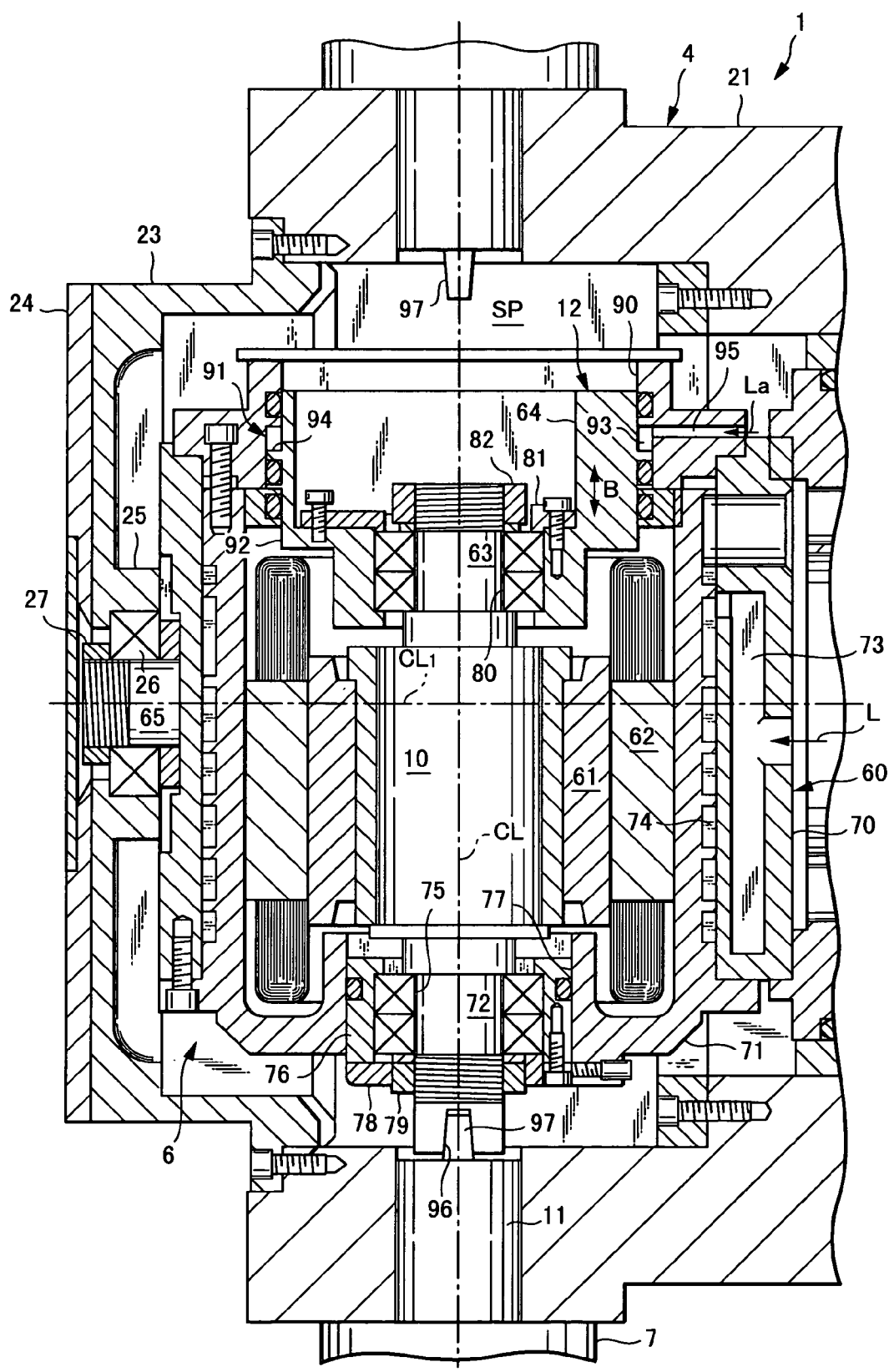

FIG. 1 to FIG. 3 show one embodiment of the present invention. FIG. 1 is a frontal view of a turret. FIG. 2 is a cross-sectional view taken along the like II—II of FIG. 1. FIG. 3 is a partially enlarged cross-sectional view of FIG. 2.

As shown in FIG. 1 to FIG. 3, at least one rotating tool (six rotating tools in this case) 2 is mounted on a turret 1 in a machine tool such as a lathe. It is possible to machine a workpiece 13 by rotating the rotating tool 2. Incidentally, the machine tool having the turret 1 may be a machine tool such as a turret machining center other than the lathe in this embodiment.

The turret 1 is provided with a turret body 3, a swiveling drum 4, a swiveling and indexing drive portion 5 and a rotational driving motor 6.

The turret body 3 is supported to a base (for example, a bed) 14 of the lathe laid on a floor surface. The case in which the turret body 3 is fixed to the base 14 of the lathe is shown but it is possible to adopt the case in which the turret body 3 may be moved relative to the base of a machine tool.

The swiveling drum 4 is supported to the turret body 3. At least one tool holder 7 for holding the rotating tool 2 is mountable on the swiveling drum 4. In the turret 1 shown in FIG. 1 to FIG. 3, other tool holders 8 for holding other tools 2a are mountable radially on the swiveling drum 4 in addition to the tool holder 7. Incidentally, it is possible to use the rotating tools (namely, the tool holders for holding the rotating tools) for all the tools which may be mounted on the turret.

The swiveling and indexing drive portion 5 has a function for swiveling the swiveling drum 4 with a swiveling and indexing motor 9 and for indexing a desired rotating tool 2 (or another tool 2a) at an index position S. The swiveling and indexing motor 9 is mounted on the turret body 3 (or the base 14 of the lathe).

The rotational driving motor 6 is a motor for rotating the rotating tool 2 and is incorporated in the swiveling drum 4 and is supported to the turret body 3. A rotating shaft 10 of the rotational driving motor 6 is always directed to the index position S.

In the turret 1, under the condition that the rotating tool 2 is indexed at the index position S, a holder shaft 11 of the tool holder 7 for holding the rotating tool 2 and a rotating shaft 10 of the rotational driving motor 6 are coupled directly with each other. Thus, the rotating tool 2 is rotated by the rotational driving motor 6.

Accordingly, it is possible to suppress a heat generation, a vibration and a noise in a power transmission mechanism for drivingly rotating the rotating tool 2 by the rotational driving motor 6. Namely, since any belt, bevel gear, bearing or the like is not used in the direct coupling type power transmission mechanism, it is possible to reduce the heat generation and the vibration. As a result, the power transmission efficiency for the rotational drive is high and it is possible to machine the workpiece by the rotating tool 2 with high precision. The vibration is suppressed so that the noise may be also reduced.

The holder shaft 11 and the rotating shaft 10 are coupled directly with each other. Accordingly, the number of the parts of the power transmission mechanism is decreased, and the structure of the turret 1 is simplified. It is also possible to make it easy to perform the maintenance work of the turret 1.

In the turret 1 in this embodiment, the rotational driving motor 6 instead of the conventional bevel gears or the like is received in an interior space SP which has been conventionally utilized to receive the bevel gears, the bearings or the like of the conventional power transmission mechanism. Namely, the interior space SP of the swiveling drum 4 is effectively utilized and the rotational driving motor 6 is arranged in this space SP. As a result, since the space for installing the rotational driving motor 6 does not have to be provided separately, it is possible to make compact the turret 1 as a whole.

The rotating shaft 10 of the rotational driving motor 6 is movable, along a rotational centerline CL of the rotating shaft 10 by a feeding and reversing drive portion 12, for engaging with and disengaging from the holder shaft 11 of the tool holder 7. Thus, it is possible to directly couple the holder shaft 11 and the rotating shaft 10 with each other and to disengage these two away from each other.

The rotating shaft 10 of the rotational driving motor 6 and the holder shaft 11 of the tool holder 7 are coupled coaxially and directly with each other. Accordingly, it is possible to rotate the rotational tool 2 at high speeds.

The structure of the turret 1 will now be described in more detail.

The turret body 3 is fixed to the bed as the base 14 of the lathe and is formed in a predetermined hollow shape. The interior of the turret body 3 is hollow. The swiveling and indexing motor 9 is mounted at a predetermined position outside of the turret body 3.

The swiveling drum 4 is supported to a tip end portion of the turret body 3 and may swivel about a swivel centerline CL1. Incidentally, there is shown the case, in which the swivel centerline CL1 is directed horizontally, but it is possible to adopt the case in which the swivel centerline CL1 is directed vertically or obliquely to the floor surface.

The swiveling drum 4 is formed in a hollow annular shape. An outer circumferential surface of a drum body 21 forming the swiveling drum 4 is formed into a polygonal shape (twelve corners in this case). A plurality (twelve in this case) of support surfaces 20, 20a are formed on the outer circumferential surface.

The tool holder 7 for supporting the rotating tool 2 is detachably mounted on the support surface 20. It is possible to use as the rotating tool 2, for example, a drill, an end mill or the like. A plurality of radial through-holes 22 opening on the support surfaces 20 is formed through the drum body 21. The holder shaft 11 of the tool holder 7 is adapted to engage in the through-hole 22.

Another tool holder 8 for holding another tool (for example, a turning tool) 2a for performing turning is mounted on the other support surface 20a. Incidentally, in the case in which the tool holder is not needed for still other tools, it is possible to directly mount the tools on the support surfaces 20a.

Thus, it is possible to radially mount the one or the plurality of tool holders 7, other tool holders 8 and still other tools which do not need the tool holders and the like about the swivel centerline CL1 on the drum body 21.

The swiveling drum 4 is provided with the drum body 21, a cover member 23 and a lid member 24 fixed to the cover member 23. The drum body 21 is supported to swivel to the turret body 3. The cover member 23 is fixed to the drum body 21 and covers an opening side (left side in FIG. 2 and FIG. 3) of the drum body 21.

The drum body 21 is supported to the turret body 3 so that the drum body 21 makes only the swiveling motion under the bound condition that it moves in neither direction of the swivel centerline CL1 nor radial direction.

The cover member 23 is formed into a bottomed hollow cylindrical shape and is fixed, to the drum body 21, to cover the interior space SP of the swiveling drum 4. A bearing support portion 25 is formed integrally to project in a central portion of the cover member 23. The disc-like lid member 24 is fastened and fixed to the cover member 23.

A swivel bearing 26 for the swiveling motion is mounted on the bearing support portion 25. An outer ring of the swivel bearing 26 is supported to the bearing support portion 25. An inner ring of the swivel bearing 26 is engaged with a projecting portion 65 fixed to a housing 60 of the rotational driving motor 6 and is positioned by a retainer member 27. Thus, the tip end side of the swiveling drum 4 is rotationally supported to the housing 60 through the swivel bearing 26.

Thus, the swiveling drum 4 is supported on one side (on the right side of FIG. 2 and FIG. 3) to the turret body 3. The swiveling drum 4 is supported on the other side (i.e., on the left side of FIG. 2 and FIG. 3) to the housing 60 of the rotational driving motor 6 so that the swiveling drum 4 may swivel. Thus, the swiveling drum 4 is kept under the condition that it is supported on both sides by the rotational driving motor 6 and the turret body 3, to thereby make the swiveling motion stably.

The swiveling and indexing drive portion 5 has the swiveling and indexing motor 9 fixed to the turret body 3, a gear 40 fixed to the drum body 21 and a clamp mechanism 41. A pinion 43 is mounted on an output shaft 42 of the swiveling and indexing motor 9. The pinion 43 meshes the gear 40.

The driving force (running torque) of the swiveling and indexing motor 9 is transmitted to the swiveling drum 4 through the output shaft 42, the pinion 43 and the gear 40. The swiveling and indexing motor 9 is controlled so that the swiveling drum 4 swivels whereby the desired rotating tool 2 or the other tool 2a is indexed at the index position S.

The clamp mechanism 41 is provided between the turret body side, which does not make the swiveling motion, and the swiveling drum side which makes the swiveling motion.

A motor supporting member 44 for supporting the rotational driving motor 6 is fixed to the tip end portion of the turret body 3. The motor supporting member 44 is located inside of the drum body 21 and has a predetermined annular shape. A cylinder member 45 having a predetermined annular shape is fixed to the inside of the gear 40.

A first cylinder portion 46 is composed of the turret body 3, the cylinder member 45, the motor supporting member 44 and the drum body 21. The first cylinder portion 46 has cylinder chambers 52 and 53.

A piston 47 is positioned in the first cylinder portion 46 so that the piston 47 is movable reciprocatingly in a direction of the swivel centerline CL1 as indicated by an arrow E. The turret body 3 restricts the piston 47 so that the piston 47 is only movable reciprocatingly in a direction of the swivel centerline CL1 but does not make any swiveling motion.

The piston 47 includes a first piston member 48, which is positioned between the drum body 21 and the motor supporting member 44, and a second piston member 49. The second piston member 49 is positioned between the cylinder member 45 and the turret body 3 and is also positioned between the cylinder member 45 and the motor supporting member 44.

A joint portion 50 is provided between the first piston member 48 and the cylinder member 45. The piston 47 and the swiveling drum 4 may be engaged with and disengaged away from each other by the joint portion 50.

A radial gear is formed on the joint portion 50 about the swivel centerline CL1. When the joint portion 50 is coupled, the swiveling drum 4 is positioned and retained to thereby keep in a condition for preventing from making the swiveling motion. When the joint portion 50 is released from the coupled condition, the swiveling drum 4 may swivel.

A compression spring 51 and a rotation-preventing pin 54 are provided in the cylinder member 45. The compression spring 51 is engaged with an engagement hole formed on the cylinder member 45. Also, the rotation-preventing pin 54 is inserted, in the engagement hole, movably in the axial direction. A tip end portion of the rotation-preventing pin 54 is engaged with a recess portion formed on the first piston member 48.

The compression spring 51 always depress the rotation-preventing pin 54 against the first piston member 48 and thereby prevents the first piston member 48 from rotating. Accordingly, even if the joint portion 50 is kept under the coupling release condition, the first piston member 48 is restricted not to make any rotational motion.

It is possible to switch over and supply pressure fluid (for example, pressure oil or compression air) into one cylinder chamber 52 and the other cylinder chamber 53 of the first cylinder portion 46. For example, the pressure fluid is supplied into one cylinder chamber 52 and the other cylinder chamber 53 is released to an atmosphere. Then, the piston 47 is moved toward the cylinder member side (in the right direction of FIG. 2). An upper half of the first cylinder portion 46 shown in FIG. 2 indicates this condition. Thus, the joint portion 50 is coupled so that the swiveling drum 4 is kept under the condition that the swiveling drum 4 never swivels and is positioned in place.

Thus, the joint portion 50 is kept under the coupled condition so that it is possible to index and position the desired rotating tool 2 or the other tool 2a at the index position S. Under this condition, the workpiece 13 is machined by the rotating tool 2 or the other tool 2a.

In the manner opposite to this, the pressure fluid is supplied into the other cylinder chamber 53, and one cylinder chamber 52 is released to the atmosphere. Then, the piston 47 is moved in the direction (in the left direction of FIG. 2) away from the cylinder member 45. A lower half of the first cylinder portion 46 shown in FIG. 2 indicates this condition.

Thus, since the joint portion 50 is released, the swiveling drum 4 may swivel. Accordingly, when the joint portion 50 is released, it is possible to index the desired rotating tool 2 or the other tool 2a at the index position S by rotating the swiveling drum 4.

The rotational driving motor 6 is fixed to the motor supporting member 44 and is disposed in the interior space SP. The rotational driving motor 6 has the housing 60 supported to the turret body side and the rotating shaft 10. The rotating shaft 10 is supported to the housing 60 and is rotatable about the rotational centerline CL.

Further, the rotational driving motor 6 has a rotor 61 mounted on the rotating shaft 10, a stator 62 and a feeding and reversing member 64 for supporting the rotating shaft 10 rotatably. The stator 62 is positioned to keep a space to the rotor 61 and outside thereof and is mounted on the housing 60.

The housing 60 has an outer housing 70 fixed to the motor supporting member 44 and an inner housing 71. The inner housing 71 is located inside of the outer housing 70 and is fixed to the outer housing 70.

The inner housing 71 rotatably supports one end portion 72 of the rotating shaft 10. The stator 62 is mounted on an inner circumferential surface of the inner housing 71. The inner ring of the swivel bearing 26 is mounted through the projecting portion 65 on the outer housing 70.

A flow path 73 and a flow path 74 are formed in communication with each other in the housing 60. Cooling fluid (for example, cooling water or cooling oil) L is supplied into the flow paths 73 and 74 to thereby cool down the rotational driving motor 6 to reduce a machining error due to the thermal deform.

The rotating shaft 10 is supported rotatably at one end portion 72 through a bearing 75 and a sleeve 76 to the inner housing 71. The sleeve 76 is positioned, slidingly in the axial direction of the rotational centerline CL, on a cylindrical inner circumferential surface 77 which is formed on the inner housing 71.

The bearing 75 is fit between an inner circumferential surface of the sleeve 76 and the rotating shaft 10. The bearing 75 is positioned and retained by an outer ring retainer member 78 and an inner ring retainer member 79. The outer ring retainer member 78 is fixed to the sleeve 76. The inner ring retainer member 79 is screwed and fixed to the rotating shaft 10.

The rotating shaft 10 is supported rotatably at the other end portion 63 through a bearing 80 to the feeding and reversing member 64. The bearing 80 is positioned and retained by an outer ring retainer member 81 fixed to the feeding and reversing member 64 and an inner ring retainer member 82 mounted on the rotating shaft 10.

The feeding and reversing member 64 has a predetermined annular shape. The feeding and reversing member 64 is positioned to the housing 60 and is movable in the direction of the rotational centerline CL as indicated by an arrow B. Namely, an outer circumferential surface of the feeding and reversing member 64 is in sliding contact with an inner circumferential surface 90 of the inner housing 71.

The feeding and reversing drive portion 12 for operating and moving the rotating shaft 10 in the direction of the centerline CL is constituted by a second cylinder 91. The second cylinder 91 is formed by the feeding and reversing member 64 and the inner housing 71.

A cylinder chamber 93 is formed between an outer circumferential surface 92 of the feeding and reversing member 64 and an inner circumferential surface 90 of the inner housing 71. A piston 94 formed integrally with the feeding and reversing member 64 is adapted to partition the cylinder chamber 93 into two chambers and is positioned on the inner circumferential surface 90 of the inner housing 71.

A flow path 95 for switching over and for supplying pressure fluid (for example, pressure oil or compression air) La is formed in the inner housing 71. The pressure fluid La is supplied from the flow path 95 into one or the other chamber, out of the two chambers of the cylinder chamber 93, so that the feeding and reversing member 64 having the piston 94 is moved as indicated by the arrow B.

Then, the rotating shaft 10 supported by the feeding and reversing member 64 through the bearing 80 makes the moving motion in the direction of the rotational centerline CL. The bearing 75, the sleeve 76 and the like connected to the rotating shaft 10 make the moving motion together with the rotating shaft 10.

A recess groove 96 extending in the swivel direction of the swiveling drum 4 and opened downwardly and in both directions (vertical direction to the paper surface of FIG. 2 and FIG. 3) is formed in one end portion 72 of the rotating shaft 10. A convex portion 97 is mounted on the holder shaft 11 of the tool holder 7. The convex portion 97 projects outwardly in the axial direction from a tip end portion of the holder shaft 11.

The recess groove 96 and the convex portion 97 are formed into a tapered shape and the convex portion 97 is detachably engaged with the recess groove 96. A joint portion 98 for coupling and decoupling the rotating shaft 10 and the tool holder 7 is composed of the recess groove 96 and the convex portion 97.

When the rotating shaft 10 is at a standstill, the rotational driving motor 6 is controlled so that the recess groove 96 of the rotating shaft 10 is directed in the swivel direction of the swiveling drum 4. Thus, when the swiveling drum 4 makes the swiveling motion, the convex portion 97 of the tool holder 7 may move and pass through the recess groove 96 in the joint portion 98.

Under the condition that the rotating tool 2 is indexed at the index portion S, the convex portion 97 may be engaged with the recess groove 96. When the rotating shaft 10 rotates under the condition that the convex portion 97 is in engagement with the recess groove 96, a running torque of the rotating shaft 10 is transferred to the holder shaft 11 in the joint portion 98 so that the rotating tool 2 is rotated.

When the swiveling drum 4 does not make the rotational motion, the feeding and reversing drive portion 12 moves the rotating shaft 10 so that the moving portion composed of the rotating shaft 10, the feeding and reversing member 64, the rotor 61, the sleeve 76 and the like is positioned on the side (downwardly) of the one end portion 72 of the rotating shaft 10.

Under this condition, when the rotational tool 2 is indexed at the index position S, the convex portion 97 is in engagement with the recess groove 96 so that the rotating shaft 10 and the holder shaft 11 are coupled with each other. Also, under this condition, the positional relationship of the rotor 61 to the stator 62 is such a positional relationship that an output torque of the rotational driving motor 6 becomes the best.

Accordingly, when a current flows through the rotational driving motor 6 to rotate the rotating shaft 10, the driving force of the motor 6 is transferred through the holder shaft 11 to the rotating tool 2. Thus, the rotating tool 2 is rotated at predetermined rotational speeds.

The operation of the turret 1 will now be described.

In order to index a desired rotating tool 2, it is necessary to retract the rotating shaft 10 of the rotational driving motor 6 to the retracted position (predetermined upper position). For this reason, the pressure fluid La is supplied to the second cylinder portion 91 so that the feeding and reversing member 64 is retracted (moved upwardly).

Then, the rotating shaft 10 connected to the feeding and reversing member 64, the rotor 61, the sleeve 76 and the like are moved upwardly together and at the same time, the recess groove 96 is positioned and directed to a predetermined direction. As a result, the recess groove 96 is separated away from the convex portion 97. The convex portion 97 may swivel without being bound by the recess groove 96.

On the other hand, in the clamp mechanism 41, the pressure fluid is supplied into the other cylinder chamber 53 so that the piston 47 is moved in a direction (in the left direction of FIG. 2) away from the cylinder member 45 to thereby decouple the joint of the joint portion 50.

Then, the swiveling and indexing motor 9 is controlled. The driving force of the swiveling and indexing motor 9 is transferred through the pinion 43 and the gear 40 to the swiveling drum 4. The swiveling drum 4 makes the swiveling motion so that the desired rotating tool 2 is indexed at the index position S.

Subsequently, when the pressure fluid La is switched over and supplied to the second cylinder portion 91 and the feeding and reversing member 64 is forwarded (lowered), the rotating shaft 10, the rotor 61 and the like are lowered. Thus, the recess groove 96 of one end portion 72 of the rotating shaft 10 is engaged under the condition that the recess groove 96 depresses the convex portion 97 of the tool holder 7 indexed at the index position S. As a result, the rotating tool 2 is coupled with the rotating shaft 10 through the holder shaft 11.

On the other hand, in the clamp mechanism 41, the pressure fluid is supplied into one cylinder chamber 52 so that the piston 47 is moved in the direction (in the right direction of FIG. 2) of the cylinder member 45 and the joint portion 50 is coupled. Thus, the swiveling drum 4 is positioned and retained at the predetermined position without any swivel.

Under this condition, the current flows through the rotational driving motor 6 to rotate the rotating shaft 10. Then, the rotating tool 2 is rotated at predetermined rotational speeds through the joint portion 98 to make it possible to machine the workpiece 13.

The present invention may be applied to a machine tool, which may machine a workpiece by mounting a rotating tool to a turret, such as a lathe and a turret type machining center.

The specific embodiment of the present invention has been described as above but the invention is not limited to the above-described specific embodiment and it is possible to modify and add the invention variously within the scope of the appended claims.

Incidentally, the same reference numerals are used to indicate the like members or components in each of the accompanied drawings.

What is claimed is:

1. A turret for machine tool in which at least one rotating tool is mounted on the turret and the at least one rotating tool is rotated for machining a workpiece, said turret comprising:
   a turret body supported to a base of the machine tool;
   a swiveling drum on which at least one tool holder for holding said at least one rotating tool is mountable and which swiveling drum is supported to said turret body;
   a swiveling and indexing drive portion for swiveling said swiveling drum with a swiveling and indexing motor and for indexing a desired rotating tool to an index position; and
   a rotational driving motor, having a rotating shaft directed to the index position, incorporated in said swiveling drum and supported to said turret body,
   wherein a holder shaft of the tool holder of said at least one rotating tool and the rotating shaft of said rotational driving motor are coupled directly with each other by axial movement of a rotor of said rotational driving motor in a stator of said rotational driving motor, so that said at least one rotating tool is rotated by said rotational driving motor while said at least one rotating tool is indexed at the index position.

2. The turret for machine tool according to claim 1, wherein the rotating shaft of said rotational driving motor is movable along a rotary centerline of the rotating shaft by a feeding and reversing drive portion so that the rotating shaft engages with the holder shaft or disengages from the holder shaft.

3. The turret for machine tool according to claim 1, wherein said swiveling drum is supported on one side to said turret body and on an other side to a housing of said rotational driving motor.

4. The turret for the machine tool according to claim 1, wherein a recess groove extending in a swivel direction of said swiveling drum and opened downwardly is formed in one end portion of said rotating shaft,
a convex portion is mounted on said holder shaft of said tool holder, said convex portion projects outwardly in the axial direction of said holder shaft from a tip end portion of said holder shaft, and
said recess groove and said convex portion constitute a joint portion for coupling and decoupling said rotating shaft and said tool holder.

5. The turret for the machine tool according to claim 4, wherein said recess groove and said convex portion are formed into a tapered shape and said convex portion is detachably engaged with said recess groove.

6. The turret for the machine tool according to claim 4, wherein when said rotating shaft is at a standstill, said rotational driving motor is controlled so that said recess groove of said rotating shaft is directed in the swivel direction of said swiveling drum,
whereby when said swiveling drum makes a swiveling motion, said convex portion of said tool holder moves and passes through said recess groove in said joint portion of said rotating shaft.

7. The turret for the machine tool according to claim 4, wherein under the condition that the at least one rotating tool is indexed at the index position, said convex portion is engaged with said recess groove, and
when said rotating shaft rotates under the condition that said convex portion is in engagement with said recess groove, a running torque of said rotating shaft is transferred to said holder shaft in said joint portion and thereby rotates the at least one rotating tool.

8. The turret for the machine tool according to claim 4, wherein when the at least one rotating tool is indexed at the index position, said convex portion is in engagement with said recess groove so that said rotating shaft and said holder shaft are coupled with each other, and under this condition, a positional relationship of a rotor of said rotational driving motor to a stator is such a positional relationship that an output torque of said rotational driving motor is at a maximum.

* * * * *